(12) United States Patent
Gazzani et al.

(10) Patent No.: US 11,020,703 B2
(45) Date of Patent: Jun. 1, 2021

(54) TEMPERATURE-SWING ADSORPTION PROCESS

(71) Applicant: CASALE SA, Lugano (CH)

(72) Inventors: Matteo Gazzani, Zurich (CH); Lisa Joss, Manchester (GB); Stefano Zanco, Zurich (CH); Marco Mazzotti, Zurich (CH)

(73) Assignee: CASALE SA, Lugano (CH)

( * ) Notice: Subject to any disclaimer, the term of this patent is extended or adjusted under 35 U.S.C. 154(b) by 115 days.

(21) Appl. No.: 16/082,816

(22) PCT Filed: Mar. 7, 2017

(86) PCT No.: PCT/EP2017/055243
§ 371 (c)(1),
(2) Date: Sep. 6, 2018

(87) PCT Pub. No.: WO2017/153365
PCT Pub. Date: Sep. 14, 2017

(65) Prior Publication Data
US 2019/0083919 A1    Mar. 21, 2019

(30) Foreign Application Priority Data
Mar. 8, 2016    (EP) .................................... 16159249

(51) Int. Cl.
*B01D 53/04*    (2006.01)
*B01D 53/96*    (2006.01)

(52) U.S. Cl.
CPC ......... *B01D 53/0462* (2013.01); *B01D 53/96* (2013.01); *B01D 2253/108* (2013.01);
(Continued)

(58) Field of Classification Search
CPC ................ B01D 53/04; B01D 53/0462; B01D 2253/108; B01D 2253/204;
(Continued)

(56) References Cited

U.S. PATENT DOCUMENTS 4,810,265 A * 3/1989 Lagree ............... B01D 53/0476
95/101
5,846,295 A * 12/1998 Kalbassi ............ B01D 53/0407
95/105
(Continued)

FOREIGN PATENT DOCUMENTS

JP    2004168553 A    6/2004
JP    2012522627 A    9/2012
(Continued)

OTHER PUBLICATIONS

International Preliminary Report of Patentability for International Application No. PCT/EP2017/055243 completed May 29, 2018.
(Continued)

*Primary Examiner* — Frank M Lawrence, Jr.
(74) *Attorney, Agent, or Firm* — Dorsey & Whitney LLP

(57) ABSTRACT

A temperature swing adsorption process for removing a target component from a gaseous mixture containing at least one side component besides the target component, said process being carried out in at least one reactor performing the following steps: an adsorption step (a), wherein an input stream of said gaseous mixture is contacted with a solid adsorbent selective for said target component, producing a first waste stream depleted of the target component; a heating step (b) for regeneration of the loaded adsorbent providing a first output stream containing the target component; a cooling step (c) of the regenerated adsorbent, said process also comprising: i) a preliminary heating step (a2) before said heating step (b), wherein a gaseous product containing said at least one side component is released from the adsorbent; ii) recycle of said gaseous product to a further adsorption step (a).

17 Claims, 1 Drawing Sheet

(52) U.S. Cl.
CPC .... *B01D 2253/204* (2013.01); *B01D 2256/22* (2013.01); *B01D 2257/504* (2013.01); *B01D 2258/0283* (2013.01); *B01D 2259/40062* (2013.01); *Y02C 20/40* (2020.08)

(58) Field of Classification Search
CPC .......... B01D 2256/22; B01D 2257/204; B01D 2258/0283; B01D 2259/40062; B01D 2259/403; Y02C 10/08
USPC ........................ 95/114, 115, 117, 139, 148
See application file for complete search history.

(56) References Cited

U.S. PATENT DOCUMENTS

| | | | | |
|---|---|---|---|---|
| 7,449,049 B2 * | 11/2008 | Thomas | ............. | B01D 53/0462 |
| | | | | 423/244.01 |
| 7,601,206 B2 * | 10/2009 | Call | ..................... | F24F 3/1423 |
| | | | | 95/113 |
| 2003/0037672 A1 * | 2/2003 | Sircar | ................ | B01D 53/0462 |
| | | | | 95/96 |
| 2007/0232706 A1 | 10/2007 | Shah et al. | | |
| 2015/0059573 A1 * | 3/2015 | Filippi | ............... | B01D 53/0462 |
| | | | | 95/139 |
| 2019/0030479 A1 * | 1/2019 | Joss | ................... | B01D 53/0462 |

FOREIGN PATENT DOCUMENTS

| | | |
|---|---|---|
| JP | 2015047581 A | 3/2015 |
| WO | 2012024804 A1 | 3/2012 |
| WO | 2013003955 A1 | 1/2013 |
| WO | 2013088564 A1 | 6/2013 |

OTHER PUBLICATIONS

International Search Report and Written Opinion for International Application No. PCT/EP2017/055243 dated Jun. 9, 2017.

* cited by examiner

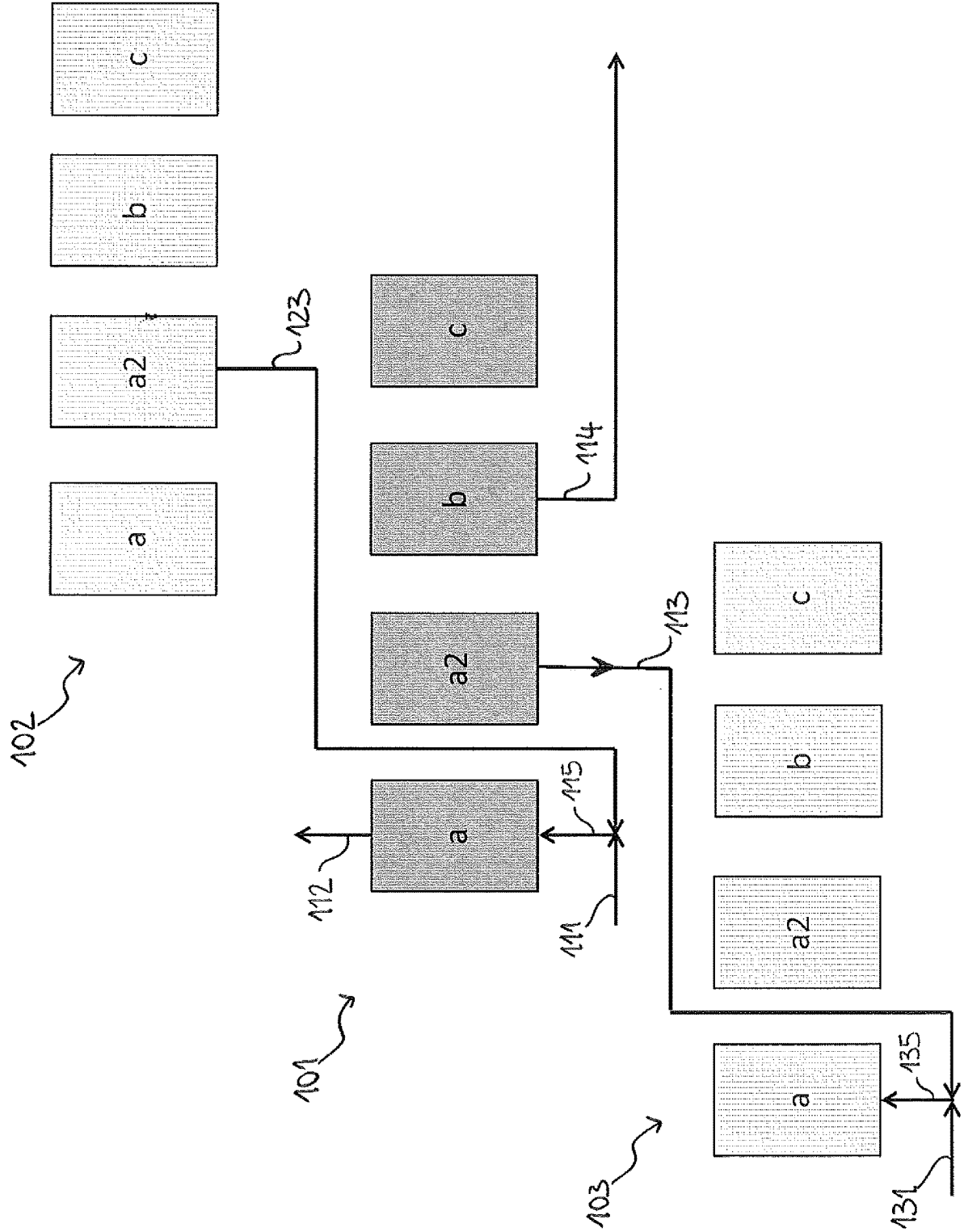

TEMPERATURE-SWING ADSORPTION PROCESS

FIELD OF THE INVENTION

The present invention relates to a process for separating a target component from a gaseous mixture also containing one or more side components, for example for separating carbon dioxide from a flue gas also containing nitrogen. In particular, the present invention relates to a process involving temperature-swing adsorption of said target component on a solid adsorbent.

PRIOR ART

The separation of a target component contained in a gas mixture is of notable importance in several fields, e.g. chemicals, fuels, food, power production. It can be desirable for environmental concerns and/or for use of such target component as raw material in an industrial process.

The separation of a target component from a gas mixture (e.g. carbon dioxide from a flue gas) can be performed via chemical scrubbing, wherein the gas mixture is contacted with a liquid solution containing a compound suitable for selectively removing said target component. Said process requires an absorber wherein the solution selectively absorbs the target component and a desorber wherein the solution is regenerated by supplying thermal energy. However, chemical scrubbing has the drawback of requiring a solution which is generally toxic, harmful and subjected to degradation. When degraded, the solution needs be replaced involving a significant cost.

Another process is temperature swing adsorption (TSA). Said process makes use of a solid adsorbent and requires alternate phases of heating and cooling of the solid adsorbent in order to carry out the adsorption and regeneration (desorption), respectively.

A TSA process for the separation of a target component from at least one side component in a gaseous mixture comprises basically: (a) an adsorption step in which the target component is adsorbed on an adsorbent bed and a side product-rich stream is produced; (b) a heating step of the loaded adsorbent during which the target component is released from the adsorbent bed and a target product-rich stream is produced; (c) a cooling step during which the adsorbent is cooled back to the adsorption temperature.

The TSA process is of great interest but still has some disadvantages.

A first drawback is a low separation performance, hence low recovery and low purity of the target product. In order to achieve a successful separation of the target component, novel adsorbents have been tested, but poor results have been achieved so far.

A second drawback is a high energy input (measured in MJ/kg of the recovered target product). Said energy input includes the thermal energy required to regenerate the adsorbent and desorb the target component. In most cases, the gaseous mixture and the obtained target component contain some water, and said energy input also comprises the thermal energy required for drying the target product.

Said two drawbacks are related. In particular, a low recovery of the target product implies a higher energy requirement for the drying operation, because more gas must be dried for the same target product production rate.

A further disadvantage is a low productivity of the target product, hence high capital cost. The term "productivity" refers to the mass flow rate of the target product produced per unit adsorbent mass and is measured in kg/h of recovered CO2 over tons of adsorbent.

Referring in particular to the separation of carbon dioxide, the need for high performances, low energy consumption and low cost is strongly felt. CO2 recovered from a flue gas can be used as chemical feedstock to produce urea or methanol or to enhance oil recovery; CO2 capture from the fumes of a combustion process minimizes carbon dioxide emissions into atmosphere; CO2 removal from air is also attractive for a number of industrial uses.

Still another problem is the following. During the adsorption step, the target component is adsorbed preferentially, having a greater affinity to the solid absorbent than the side component(s). An amount of the side component(s), however, is also unavoidably adsorbed together with the target component, resulting in an adsorbent which is predominantly loaded with the target component but is also partially loaded with the side component(s). The above is detrimental to the purity of the obtainable output stream of the target component.

SUMMARY OF THE INVENTION

The invention aims to overcome the drawbacks of the prior art. In greater detail, the invention aims to provide a process, which is able to achieve, over the prior art: high purity and high recovery of the target component, low energy consumption, high productivity and low capital costs.

This aim is reached with a temperature swing adsorption process for removing a target component from a gaseous stream according to claim 1.

Said process is carried out in at least one reactor performing the following steps: (a) an adsorption step, comprising contacting an input stream of said gaseous mixture with a solid adsorbent and comprising adsorption of the target component contained in the input stream, providing a target component-loaded adsorbent and a first waste stream depleted of the target component; (b) heating of the loaded adsorbent and desorption of a first amount of target component, providing a partially regenerated adsorbent and a first output stream containing the desorbed target component; (c) cooling of said at least partially regenerated adsorbent. During said cooling step (c), the adsorbent is advantageously cooled down to a temperature suitable for carrying out the adsorption step (a), so that the cycle can start again.

The process is characterized in that said at least one reactor performs a preliminary heating step (a2) before said heating step (b). During said preliminary heating step (a2) a gaseous product containing said at least one side component is released from the adsorbent. Said gaseous product is then recirculated and submitted to a further adsorption step (a).

Preferably, the adsorbent is a fixed bed adsorbent.

During the adsorption step (a) at least a portion of the target component contained in the input stream is adsorbed. Preferably the full amount or substantially the full amount of the target component in the input stream is adsorbed.

According to a preferred embodiment, said process is carried out in a plurality of reactors and each reactor performs the above sequence of adsorption step (a), preliminary heating step (a2), heating step (b), cooling step (c). Accordingly, the gaseous product released from the preliminary heating step (a2) of each reactor is recycled to at least one other reactor of said plurality of reactors, to perform said further adsorption step (a). A single-reactor embodiment is also contemplated by the invention, wherein said gaseous product from the preliminary heating step (a2) is stored for use in a subsequent adsorption step (a).

Preferably, the gaseous product released from said preliminary heating step (a2) is mixed with a gaseous mixture feed stream to form the input stream to said further adsorption step (a).

During the preliminary heating step (a2) a portion of the target component is generally desorbed together with the side component(s), which means that the gaseous product released during said preliminary heating step (a2) also contains a portion of the target component. The preliminary heating step (a2) is controlled in order to desorb a stream predominantly made of the side component(s) adsorbed during the previous adsorption step (a), and in order to reduce the desorption of the target component. To this purpose, the preliminary heating step (a2) is carried out at a suitable low temperature. More in detail, said preliminary heating reaches a temperature which is lower than the temperature reached during the subsequent heating step (b). More preferably, the temperature of the preliminary heating step (a2) is at least 40° C. lower than the temperature of the heating step (b).

The temperature of the preliminary heating step is selected in such a way to desorb most of the side component(s) avoiding at the same time a significant desorption of the target component. Accordingly, the majority of the target component remains in the adsorbent to be released in the subsequent main heating step, and the gaseous effluent of the preliminary heating step (a2) contains a significant amount of the at least one side component. In preferred embodiments, said gaseous effluent contains predominantly said at least one side component.

Preferably, said gaseous product contains 20% or more of the side component, more preferably 50% or more of the side component. In typical embodiments it contains 30 to 80%, more preferably 50% to 80% of the side component.

The target component desorbed during the preliminary heating step (a2) can be recovered within the same reactor, after an intermediate storage, or within another reactor undergoing the adsorption step (a). When the gaseous product from preliminary heating of one reactor is sent to adsorption in another reactor, an intermediate storage may also be provided in some embodiments.

More in detail, according to some embodiments of the invention said gaseous product is exchanged from a reactor undergoing the preliminary heating step (a2) to another reactor undergoing the adsorption step (a) without an intermediate storage. This means that the preliminary heating step (a2) and the adsorption step (a) of two different reactors exchanging said gaseous product are synchronized and while one reactor performs the preliminary heating step (a2) the other reactor performs the adsorption step (a).

In other embodiments, said gaseous product is exchanged from a reactor undergoing the preliminary heating step (a2) to another reactor undergoing the adsorption step (a) with an intermediate storage in a suitable tank. This means that the preliminary heating step (a2) and the adsorption step (a) of two different reactors exchanging said gaseous product are not synchronized. The embodiments with said intermediate storage provide a greater flexibility since the duration of steps (a) and (a2) of the two reactors may be different.

According to a first embodiment, said preliminary heating step (a2) comprises indirect heat exchange. According to a second embodiment, said preliminary heating step (a2) comprises direct heat exchange with a heating medium in contact with the adsorbent. Preferably, said heating medium is a stream containing predominantly the target component.

For example, said heating medium is provided by the above identified output stream containing the target component.

Similarly, the main heating step (b) may comprise direct heat exchange with a heating medium in contact with the adsorbent or indirect heat exchange. Also the cooling step (c) can comprise either direct or indirect heat exchange. When the cooling step (c) comprise direct heat exchange, preferably the cooling medium is a stream depleted of the target component and preferably contains said at least one side component; for example, said cooling medium is provided by the above identified target component depleted-waste stream.

Further embodiments even provide both direct and indirect heat exchange for said heating step (b) and/or said cooling step (c).

Indirect heat exchange denotes that the heat exchange takes place with a surface of separation between the adsorbent and a heat transfer (heating or cooling) medium. In some embodiments, suitable heat exchange bodies such as plates or tubes are immersed in the adsorbent and fed with said medium. Some embodiments use tubes filled with the adsorbent and a heat exchange medium which is fed outside the tubes, for example in the shell side of an absorber.

Direct heat exchange has the advantage that the adsorbent is directly contacted with a heating or cooling medium, which avoids the installation of heat exchange bodies, thus reducing the thermal inertia and ensuring a better heat exchange. On the other hand, indirect heat exchange may be preferred because the absence of a contact between the adsorbent and the heating or cooling medium ensures a higher working capacity of the adsorbent and provides more freedom to select the heat exchange fluids.

The present invention provides for an increased purity and an increased recovery of the target component. By means of the preliminary heating step, the adsorbent is cleaned from the side components, which means that the purity of the target component stream obtainable by the subsequent main heating is increased. In addition, the gaseous stream released by the preliminary heating step is further submitted to an adsorption step to recover the target component contained therein.

According to a preferred application of the invention, the target component is carbon dioxide. Preferably, said at least one side component includes nitrogen.

The gaseous mixture may contain some water. Water may be detrimental to the adsorption of the target component, e.g. water may compete with the target component during adsorption over a number of adsorbents. The process of the invention may include a preliminary step of removal of water from the gaseous mixture prior to adsorption of the target component, or may use a specific adsorbent which is also selective over water.

According to some embodiments, the adsorbent is selective for adsorption of the target component over the side component(s) and also over water. In the case of carbon dioxide as the target component, a chemical adsorbent chosen among MOF (Metal Organic Framework) CP027, UTSA16, UIO66, amine-doped MOFs is preferably used thanks to its high capacity and high selectivity of adsorbing carbon dioxide over water.

According to further embodiments, the adsorbent comprises a first layer of a first material suitable for selectively adsorbing water and a second layer of a second material suitable for selectively adsorbing the target component (e.g. carbon dioxide). Accordingly, the adsorption step comprises removal of water in the first layer and then removal of the target component in the second layer. Said materials are preferably regenerated in the same temperature range.

According to further embodiments, said gaseous mixture is subjected to a dehydration process before contacting the adsorbent in order to at least partially remove water. Preferably, said dehydration process is carried out using an adsorbent material adapted to selectively adsorb water. Examples of such material include silica, activated alumina, 4A zeolite. In the case of carbon dioxide as target component and nitrogen as side component, adsorbents such as zeolite 13X, zeolite 5A, zeolite 4A, zeolite ZSM5, activated carbon are preferably used, having high capacity and high selectivity for the CO2 over the N2.

A further aspect of the invention is a relatively low temperature of the heating step (b), that is a low regeneration temperature. Said temperature is preferably not greater than 250° C., more preferably not greater than 200° C. and even more preferably not greater than 170° C. A low regeneration temperature is an advantage because it entails a greater difference of temperature (delta-T) between the adsorbent and the available heat source, thus making regeneration more efficient.

The gaseous mixture can be a flue gas, for example from a combustion process. Said flue gas may come from a power plant or from a chemical process, according to preferred applications of the invention. The recovered target component can be sequestrated (e.g. CO2 sequestration) or used in another process, depending on the case.

An object of the present invention is the use of the above described process for treating a flue gas of an ammonia or methanol or urea plant. In case of methanol or urea plant, some embodiments include the use of recovered CO2 as a feedstock.

A plant for carrying out said process is also object of the present invention.

The advantages of the invention will be elucidated with the help of the following description of preferred and non-limiting embodiments.

DETAILED DESCRIPTION OF A PREFERRED EMBODIMENT

FIG. 1 is a block diagram of a temperature swing adsorption process for removing the carbon dioxide from a flue gas, according to an embodiment of the invention.

Referring to FIG. 1, the process of the invention is carried out in a plurality of reactors, for example including reactors 101, 102, 103. Each reactor 101-103 contains a fixed bed of an adsorbent for a target component, for example zeolite 13X for adsorption of CO2.

Each reactor performs a number of steps, namely: an adsorption step (a), a preliminary heating step (a2), a heating step (b) and a cooling step (c). In FIG. 1, the blocks (a), (a2), (b), (c) denote the reactors 101, 102, 103 while performing said process steps.

During adsorption step (a), a gas to be treated, for example a flue gas, is admitted to the reactor and the target component is preferentially adsorbed, resulting in a waste stream and loading the adsorbent with the target component. During the preliminary heating step (a2), the adsorbent is slightly heated in order to remove the one or more side components from the adsorbent. During the main heating step (b), the adsorbent is heated by direct or indirect heat exchange, resulting in desorption of the target component and regeneration of the adsorbent. During the cooling step (c), the temperature of the adsorbent is lowered in order to start again the cycle with step (a).

The above steps are now elucidated with reference to the reactor 101 and to a preferred embodiment.

Adsorption Step (a)

A combustion flue gas 111 predominantly containing carbon dioxide (CO2) and nitrogen (N2) is mixed with a gaseous product 123 predominantly containing N2 and a small amount of CO2, and the resulting mixture 115 is supplied to the reactor 101. Said gaseous product 123 is produced by another reactor, for example by reactor 102, while performing the preliminary heating step (a2).

During step (a), CO2 is adsorbed over the zeolite bed of the reactor 101 providing a CO2-loaded adsorbent and a CO2-depleted effluent 112 predominantly containing N2 is exported and can be vented or used for a further scope if appropriate. For example, in an ammonia plant, said stream 112, which is rich in nitrogen, can be used for the synthesis of ammonia. A minor portion of N2 is also adsorbed over the zeolite bed, such portion being much smaller than the adsorbed CO2.

In some embodiments, the adsorption step (a) of the reactor 101 and the preliminary heating (a2) of the reactor 102 are synchronized, which means that the gaseous product 123 leaving the reactor 102 passes into the reactor 101 without an intermediate storage. In other embodiments, said gaseous product 123, produced by the preliminary heating step (a2) of reactor 102, is stored in a suitable tank outside the reactor 102 and subsequently introduced into the reactor 101 undergoing step (a).

Preliminary Heating Step (a2)

The CO2-loaded adsorbent contained in the reactor 101 is heated to a selected temperature lower than the temperature of the subsequent main heating step (b). For example, the temperature reached by the adsorbent during said preliminary heating step (a2) is comprised between 360 and 380 K (87-107° C.).

During said step (a2), some nitrogen and a small amount of CO2 are desorbed providing a gaseous product 113. During said step (a2), the pressure is kept constant and only the bottom end of the reactor is kept open.

The so obtained gaseous product 113 is subsequently mixed to the flue gas feed of another reactor, in the same manner as the gaseous product 123 previously described, in order to recover the CO2 contained therein. For example, said gaseous product 113 is mixed with a flue gas 131 admitted to a third reactor 103, to form a mixture 135.

In some embodiments, the gaseous product 113 can be subjected to adsorption step (a) in the same reactor 101. In a such a case, said gaseous product 113 is stored in a suitable tank before being recycled to the reactor.

Main Heating Step (b) and Cooling Step (c)

The adsorbent still loaded with CO2 is heated, for example to 420 K (147° C.); as a consequence, the CO2 is desorbed producing a current 114 of CO2 of a high purity and the adsorbent of the reactor 101 is regenerated.

The regenerated adsorbent is subsequently cooled down to the adsorption temperature, for example to the ambient temperature in order to restart the cycle.

The invention claimed is:

1. A temperature swing adsorption process for removing a target component from a gaseous mixture containing at least one side component besides the target component, said temperature swing adsorption process being carried out in at least one reactor that performs a process comprising:
   (a) an adsorption step, including contacting an input stream of said gaseous mixture with a solid adsorbent and adsorption of target component from said input stream, thereby providing a target component-loaded adsorbent and a first waste stream depleted of the target component;

(b) heating the target component-loaded adsorbent and desorption of at least part of said target component, thereby providing an at least partially regenerated adsorbent and an output stream containing the desorbed target component; and (c) cooling said at least partially regenerated adsorbent;

wherein said at least one reactor includes a plurality of reactors that performs a preliminary heating step (a2) before said heating step (b);

wherein during said preliminary heating step (a2), a gaseous product containing said at least one side component is released from the adsorbent;

wherein said gaseous product is submitted to a further adsorption step (a);

wherein said process is carried out in the plurality of reactors each of which performs said sequence of adsorption step (a), preliminary heating step (a2), heating step (b), and cooling step (c);

wherein the gaseous product released from the preliminary heating step (a2) of each of the plurality of reactors is submitted to said further adsorption step (a) into at least one other reactor of said plurality of reactors;

wherein the heating step (b) is performed at a temperature not greater than 170° C.;

wherein the target component includes carbon dioxide;

wherein the gaseous mixture includes a flue gas of a methanol plant or a urea plant;

wherein the carbon dioxide recovered from the flue gas is used as a feedstock for the methanol plant or the urea plant.

2. The temperature swing adsorption process of claim 1, wherein said gaseous product is exchanged without intermediate storage from a source reactor undergoing the preliminary heating step (a2) to at least one other reactor of the plurality of reactors undergoing the adsorption step (a).

3. The temperature swing adsorption process of claim 1, wherein said gaseous product is submitted to the further adsorption step (a) after an intermediate storage in a tank.

4. The temperature swing adsorption process of claim 1, wherein said gaseous product is mixed with a fresh input stream of said gaseous mixture before admission to the further adsorption step (a).

5. The temperature swing adsorption process of claim 1, wherein said preliminary heating step (a2) is carried out at a temperature lower than a temperature of the subsequent heating step (b).

6. The temperature swing adsorption process of claim 5, wherein the temperature of said preliminary heating step (a2) is at least 40° C. lower than the temperature of the subsequent heating step (b).

7. The temperature swing adsorption process of claim 1, wherein said gaseous product, which is released during the preliminary heating step (a2), contains from 20% to 80% of the at least one side component.

8. The temperature swing adsorption process of claim 1, wherein said preliminary heating step (a2) includes indirect heat exchange.

9. The temperature swing adsorption process of claim 1, wherein said preliminary heating step (a2) includes direct heat exchange with a heating medium.

10. The temperature swing adsorption process of claim 9, wherein said heating medium includes a stream predominantly containing the target component.

11. The temperature swing adsorption process of claim 1, wherein the heating step (b) includes direct heat exchange with a heating medium in contact with the adsorbent.

12. The temperature swing adsorption process of claim 11, wherein said heating medium includes a stream containing predominantly the target component.

13. The temperature swing adsorption process of claim 1, wherein the cooling step (c) includes a direct heat exchange with a cooling medium in contact with the adsorbent.

14. The temperature swing adsorption process of claim 13, wherein said cooling medium includes a target component depleted-waste stream.

15. The temperature swing adsorption process of claim 1, wherein the heating step (b) and/or the cooling step (c) include an indirect heat exchange.

16. The temperature swing adsorption process of claim 1, wherein said solid adsorbent is configured to selectively adsorb the target component over said at least one side component and also over water.

17. The temperature swing adsorption process of claim 1, wherein said solid adsorbent includes a first layer having a first material configured to selectively adsorb water and a second layer having a second material configured to selectively adsorb the target component.

* * * * *